April 3, 1962 J. CORNELL ETAL 3,028,547
SERVO MOTOR SYSTEM
Filed Feb. 25, 1957
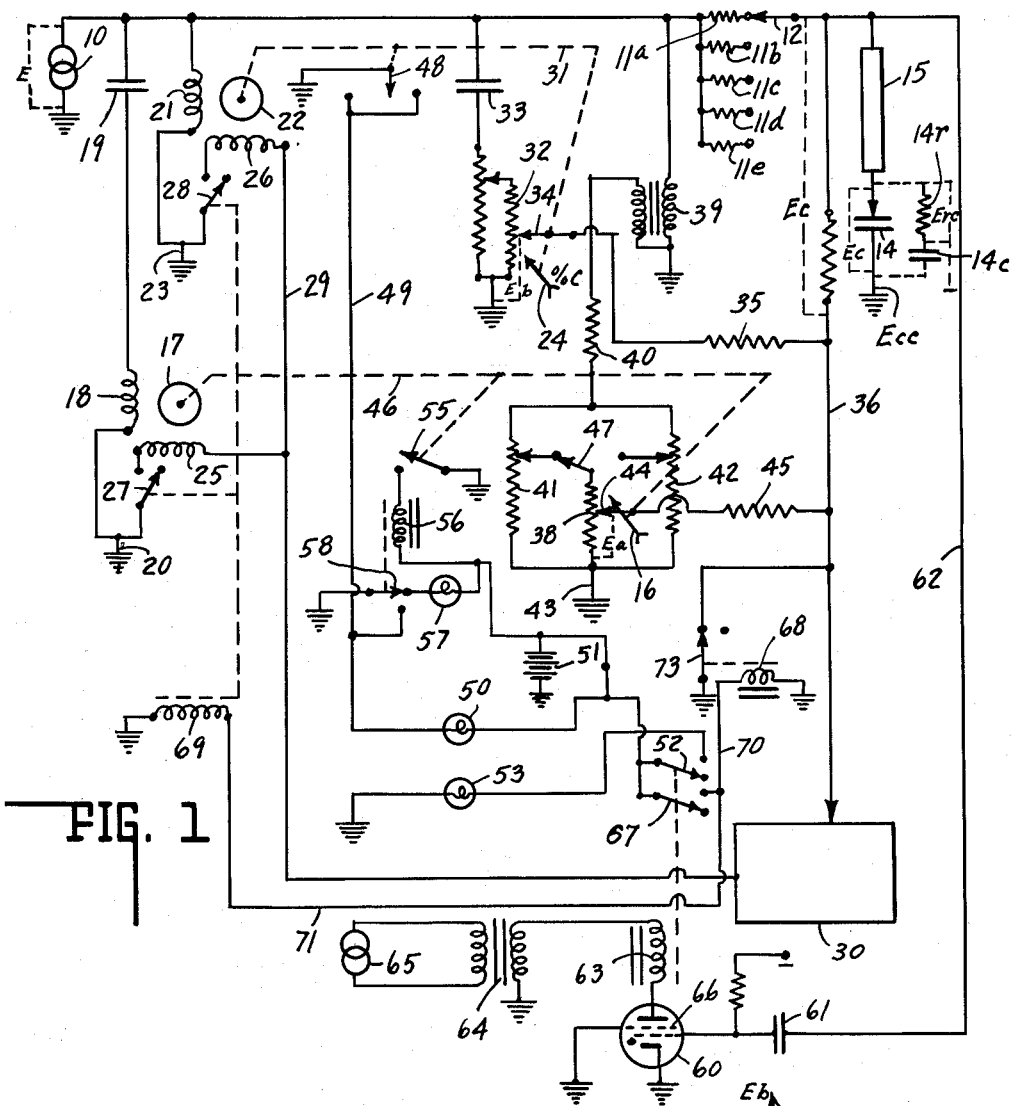
FIG. 1
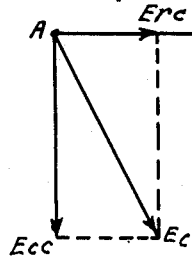
FIG. 2
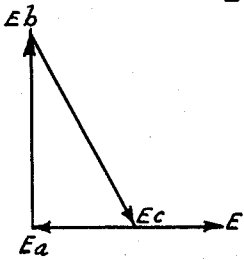
FIG. 3
FIG. 4
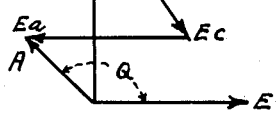
INVENTORS.
JOHN CORNELL.
DONALD H. LESTER.
BY Lockwood, Galt, Woodard & Smith
ATTORNEYS.

United States Patent Office 3,028,547
Patented Apr. 3, 1962

3,028,547
SERVO MOTOR SYSTEM
John Cornell, Scranton, Pa., and Donald H. Lester, Goodyear, Ariz., assignors to The Magnavox Company, Fort Wayne, Ind., a corporation
Filed Feb. 25, 1957, Ser. No. 641,965
2 Claims. (Cl. 324—57)

This invention relates generally to servo motor systems and more particularly it relates to the application of servo motor systems to electrical measuring devices.

In conventional servo motor systems wherein two or more servo motors are employed for controlling a circuit or a device, it is conventional to employ an amplifier in circuit with the control field of each motor. It is the principal object of this invention to provide a control circuit for two or more servo motors wherein two independent control signals may be multiplexed so that a single amplifier may be used to control the two or more servo motors and thereby to control two or more independently controlled circuits, machines, or processes.

In accordance with the teaching of the prior art, electrical capacitors, for example, are individually tested in the factory with respect to their effective series resistance and series capacity before they are approved for sale. Conventional tests consist of a separate test for effective series resistance and a separate test for effective series capacity. This is a time-consuming operation and adds materially to the cost of capacitors.

Accordingly, it is another object of this invention to adapt the servo motor system of this invention for the simultaneous testing of several different parameters of an impedance such, for example, as those of a capacitor.

In accordance with this invention, there is provided a servo motor system consisting of two or more conventional servo motors, the control fields of which are coupled to a single, zero phase-shift, amplifier. Two separate control signals, varying in amplitude and phase in proportion to two control parameters but constrained to be at all times 90° out of phase with one another, may be fed into the amplifier. The line fields of said motors are connected to voltages 90° out of phase with one another whereby each amplified control signal will be effective to control only one motor.

In accordance with another feature of this invention, there is provided an electrical measuring device adapted automatically and simultaneously to measure at least two electrical quantities which are characteristic of apparatus such as an electrical capacitor. There is provided a test probe which an operator may use to contact a terminal of a capacitor, two servo motors, the line fields of which are connected to voltages 90° out of phase with one another, the control fields of said servo motors being coupled to the output of a zero phase-shift amplifier, said amplifier being fed with control voltages representative of resistive and capacitive component voltages, said control voltages being effective to cause rotation of said motors for providing an indication of said control voltages.

The full nature of the invention will be understood from the accompanying drawings and the following description and claims:

FIG. 1 is a circuit diagram of the servo motor system provided by this invention.

FIG. 2 is a vector diagram illustrating the voltages across a capacitor under test in the system illustrated in FIG. 1.

FIG. 3 is a vector diagram illustrating the effect of adding voltages 180° out of phase to the voltages shown vectorially in FIG. 2.

FIG. 4 is a vector diagram illustrating the voltages which occur as a result of an unbalanced condition in the system of FIG. 1 which results when an off-standard capacitor is tested.

The servo motor system of this invention comprises a source of voltage 10 having a stable frequency of sixty cycles or one hundred twenty cycles. One side of the source 10 may be grounded while the other side thereof may be connected through one of the resistors 11a, 11b, 11c, 11d and 11e in resistor bank 11 which may be selected by means of range switch 12. When the system is to be utilized for testing capacitors, the capacitor 14 which is under test may be connected between ground and range switch 12 by means of a probe 15, the probe being conventional and having means for contacting the terminal of an electrical impedance such, for example, as a capacitor.

For driving an indicator, shown schematically at 16, and indicating the degree of variation from a given standard of the effective resistance of capacitor 14, there is provided a first servo motor 17 having a line field 18 coupled to the source 10 through a 90° phase-shifting capacity 19 and also connected to ground at 20. For driving an indicator, shown schematically at 24, and indicating the degree of variation of the effective capacity of capacitor 14 from a given standard, there is provided a second servo motor 22, the line field 21 of which may be connected directly to voltage source 10 and to ground 23. The control fields 25 and 26 respectively of motors 17 and 22 may be connected to ground through switches 27 and 28 respectively and in multiple through line 29 to the output of a zero phase-shift amplifier 30.

A linear potentiometer 32 may be coupled between ground and voltage source 10 through a very low loss 90° phase-shifting capacitor 33, and the sliding contact 34 thereof may be mechanically coupled to servo motor 22, as indicated at 31, and electrically coupled through resistor 35 and line 36 to the input of amplifier 30. Potentiometer 32 is utilized for introducing voltages 180° out of phase with the voltage $E_{cc}$, the capacitive component of voltage across capacitor 14.

A second linear potentiometer 38 may be coupled to voltage source 10 through a 180° phase-shifting transformer 39, a resistor 40 and one of the parallel resistors 41 and 42, as well as to ground at 43. The sliding contact 44 of potentiometer 38 may be mechanically coupled to servo motor 17, as shown at 46, and controlled thereby. Sliding contact 44 may be electrically coupled through resistor 45 and line 36 to the input to the amplifier 30. Potentiometer 38 is effective to introduce voltages 180° out of phase with $E_{rc}$, the resistive component of voltage across capacitor 14.

When it is desired to separate manufactured capacitors into different grades of quality, the probe 15 may be provided with a switch 47 connected between potentiometer 38 and the sliders on resistors 41 and 42. Switch 47 may normally connect resistor 41 with potentiometer 38 to provide a test within a relatively limited resistance range. If a capacitor does not test within the range of resistor 41, then switch 47 may be operated to connect resistor 42 with potentiometer 38 for doubling the testing range with respect to resistance. If the series resistance of the capacitor under test is within twice the original limit of resistor 41, certain indications appear in the circuit which will be subsequently explained.

In order to provide indications that a capacitor has electrical characteristics which are beyond the limits of preset tolerances, the servo motor 22 may be provided with a single pole, double throw, high-low limit switch 48, the blade of which may be connected to ground as illustrated and the contacts of which may be connected through line 49 with a red indicator lamp 50. A battery 51 may be connected to the red lamp 50 and through switch contact 52 with a yellow lamp 53. The lamps 50 and 53 may be mounted on the structure of probe 15 in any suitable manner. Limit switch 48 may be set to operate at minus 20% and plus 300% of nominal capacity of the capacitor 14 which is under test. This range may be adjusted to satisfy manufacturing requirements.

The servo motor 17 may be provided with a high limit switch 55 connected in series with relay 56 and battery 51. As shown in the drawings, a green lamp 57 is normally connected in circuit with battery 51 by the contact 58 of relay 56 for the purpose of indicating that the resistance of capacitor 14 is within normal tolerance limits. When the high limit switch 55 is closed, relay 56 is energized to disconnect green lamp 57 and establish a connection through line 49 with the red lamp 50 thereby to indicate that the capacitor 14 has a resistance value which is beyond the preset tolerance limits.

For preventing the servo motors 17 and 22 from running through their stop positions when no capacitor is in contact with probe 15 and also for indicating to the operator when electrical contact has been established with all sections of a multi-section capacitor, there is provided an automatic cut-off circuit consisting of a "thyratron" 60, the input of which is normally coupled through a coupling capacitor 61 and line 62 with probe 15. The anode of thyratron 60 may be coupled through a relay 63 to the secondary winding of transformer 64, in turn coupled to a suitable alternating current source 65.

When no capacitor 14 is in contact with probe 15, a high alternating current voltage is applied from source 65 through the transformer 64 to the grid 66 of tube 60 causing the tube to fire and operate relay 63. The switch contacts 52 and 67 are mechanically coupled to the armature of relay 63 and operate to close a circuit between battery 51 and relays 68 and 69 connected in multiple to ground through lines 70 and 71. Relay 68 includes switch contact 73 which is closed when no capacitor is under test to ground the input of amplifier 30. Relay 69 is operable to close switches 27 and 28 thereby to open the control field circuits of servo motors 17 and 22.

When probe 15 is in contact with a capacitor, the thyratron 60 is biased to cut off, releasing relays 63, 68 and 69 and restoring the amplifier input circuit and the control field circuits of motors 17 and 22 to normal condition. In this condition, switch contact 52 of relay 63 connects the yellow lamp 53 with battery 51 thereby providing the operator with an indication that the probe 15 is electrically connected with capacitor 14.

In operation, the range switch 12 may be set to contact one of the resistors 11a, 11b, 11c, 11d or 11e, depending upon the capacity value in microfarads of capacitor 14 which is under test. The probe 15 may be contacted with capacity 14 thereby to impress a voltage of standard frequency thereon. As a result, a voltage Ec appears across capacitor 14. In order to provide the desired phase relationship, the resistance 11 is made much greater than the reactance. Referring to FIG. 2 of the drawings, a vector Ec may be resolved into its rectangular components representing the voltage $E_{rc}$, that would appear across the effective series resistance 14r, and the voltage $E_{cc}$, that would appear across the effective series capacity 14c of capacitor 14.

The potentiometer 38 has impressed on it by transformer 39 a voltage 180° out of phase with the voltage E of source 10 and therefore functions to introduce voltage Ea into the input of zero phase-shift amplifier 30. In order to provide the desired phase relationship, the reactance $X_{ca}$ is made much greater than the resistance 32. Potentiometer 32 has impressed on it a current leading 90° out of phase with the voltage E of source 10 and therefore impresses a voltage Eb on the input of amplifier 30.

Referring to FIG. 3 of the drawings, it will be seen that the vector sum of these voltages will be zero. Since these introduced voltages Ea and Eb are proportional to the voltages across the effective series resistance 14r and effective series capacity 14c of the capacitor 14, the potentiometers 32 and 38 may be readily calibrated to provide an indication of the value of the effective series resistance and the effective series capacity.

Servo motors 22 and 25 are coupled mechanically to the sliding contacts 34 and 44 of these potentiometers to accomplish a balancing process whereby balancing voltages Ea and Eb are introduced into the input of amplifier 30. The voltage applied to the line field 21 of servo motor 22 is in phase with the voltage E of source 10 while the line voltage applied to the line field 18 of motor 17 is shifted 90° whereby it is in phase with voltage Eb. It will be recalled that the control fields 25 and 26 of motors 17 and 22 are connected through line 29 to the output of amplifier 30 having zero phase shift.

It can be seen from the vector diagram of FIG. 4 that an unbalanced condition will result in a polar vector with some magnitude A and any phase angle from zero to 360°. By resolving this vector into its rectangular components, it can be seen that one component will be 90° out of phase with the voltage applied to the line field of one motor thereby producing torque, while it will be either in phase or 180° out of phase with the voltage applied to the line field of the other motor and no torque is produced. The same applies to the other component of the polar vector. Therefore, an unbalance in resistance will only cause the servo motor 17 attached to the resistance indicating potentiometer 38 to turn, while an unbalance in capacity will only cause the servo motor 22 attached to the capacity indicating potentiometer 32 to turn. This allows the use of one servo amplifier 30 for control of two servo motors performing independent functions.

It will be assumed that the potentiometers 32 and 38 have been initially calibrated to provide a zero reading when a capacitor having standard series resistance and standard series capacity is connected to probe 15. It will be further assumed that limit switches 48 and 55 have been properly adjusted to operate at the desired limits of variation in effective series resistance and effective series capacity of the capacitors to be tested. Therefore, the servo motors 17 and 22 will drive potentiometers 32 and 38 until a balanced condition occurs in the input of amplifier 30 at which time the servo motors stop and provide a direct reading of variation from the standard with respect to effective series resistance and effective series capacity of a capacitor 14 under test.

When probe 15 was initially placed in contact with capacitor 14, switch 52 was closed to energize the yellow lamp 53 thereby indicating to the operator that contact has been made between probe 15 and capacitor 14. If, during a test, the yellow lamp 53 remains illuminated and green lamp 57 is on, the effective series resistance and the effective series capacity of capacitor 14 are within acceptable limits. If the red lamp 50 is energized by the high-low limit switch 48 and yellow lamp 53 is energized, the effective series resistance or the effective series capacity, or both, are beyond the acceptable limits of tolerance. If it is found that the green lamp 57 is extinguished, there is an indication that the capacitor has an excessively high effective series resistance. In this event, the switch 47 may be operated to close with the adjustable potentiometer 42 and in this case, if the red lamp 50 is extinguished, the capacitor is excessively high with respect to effective series resistance and should be given a "grade 2" rating. If the red lamp 50 remains energized when switch 47 is operated, the capacitor may be beyond tolerable limits with respect to capacity or resistance, or both. In the event that the green lamp 57 is extinguished when switch 47 is operated, the capacitor is beyond the limits which can be tolerated in "grade 2" and should be discarded. If the green lamp 57 remains illuminated, the capacitor is beyond limits with respect to capacity only.

From the foregoing description, it will be apparent that this invention provides a servo motor system wherein a single amplifier operates as a duplex device for controlling the operation of two servo motors. Obviously, this is a material saving with respect to initial cost and with respect to maintenance. The invention also provides a device particularly adapted to test simultaneously two parameters of an electrical component such as a capacitor, inductor or resistor. A substantial number of components such as capacitors may be arranged in a tray and tested one after another by simply manipulating the probe from the terminal of one capacitor to another. In fact, several sections of a capacitor may be tested simultaneously by mounting a plurality of units such as that shown in FIG. 1 back of a panel and adjacent to a test position on a bench. It has been found by actual tests that a reasonably skilled operator can test 1900 capacitors per hour.

The invention claimed is:

1. A testing system comprising a source of alternating voltage, an electrical impedance coupled thereto for testing, a first servo motor including an indicator driven thereby and having a line field winding and a control field winding, said line field winding being connected directly to said source, a second servo motor including an indicator driven thereby and having a line field winding and a control field winding, ninety degree phase-shifting means coupling the line field winding of said second servo motor to said source, a first source of balancing potential adjusted to a standard value of one parameter of said impedance, means coupling said first source of balancing potential to said alternating source for shifting its phase ninety degrees with respect to the phase of said alternating voltage, a second source of balancing potential adjusted to a standard value of another parameter of said impedance, means coupled to said alternating source and said second source of balancing potential for shifting the phase thereof one hundred eighty degrees with respect to said alternating voltage, and a single channel amplifier having its output coupled to said control field windings, and its input to said sources of balancing potential, and said impedance for applying the sum of said balancing potentials and the potential on said impedance to said control field windings to produce indications of the parameters of said impedance.

2. A servo motor control system comprising a source of alternating voltage, an electrical impedance coupled thereto for testing, a first servo motor including an indicator driven thereby and having a line field winding and a control field winding, a second servo motor including an indicator driven thereby and having a line field winding, and a control field winding, means coupling said line field windings of said motors to said source out of phase with one another, a first source of balancing potential coupled to and phased to drive one of said motors and adjusted to a standard value of one parameter of said impedance, a second source of balancing potential coupled to and phased differently from said first source of balancing potential to drive the other of said motors and adjusted to a standard value of another parameter of said impedance, and means having its input coupled to said first and second sources and to said impedance for applying said balancing potentials to said control field windings to drive said motors, balance said balancing potentials and produce indications of the parameters of said impedance.

References Cited in the file of this patent

UNITED STATES PATENTS

| | | |
|---|---|---|
| 2,597,730 | Hornfeck | May 20, 1952 |
| 2,639,411 | Schafer | May 19, 1953 |
| 2,783,421 | Hering | Feb. 26, 1957 |
| 2,835,854 | Uhrig | May 20, 1958 |